Feb. 16, 1960  H. A. HAAS  2,925,285
FIFTH WHEEL STEERING ASSEMBLY FOR TRAILERS
Filed March 3, 1958  3 Sheets-Sheet 1
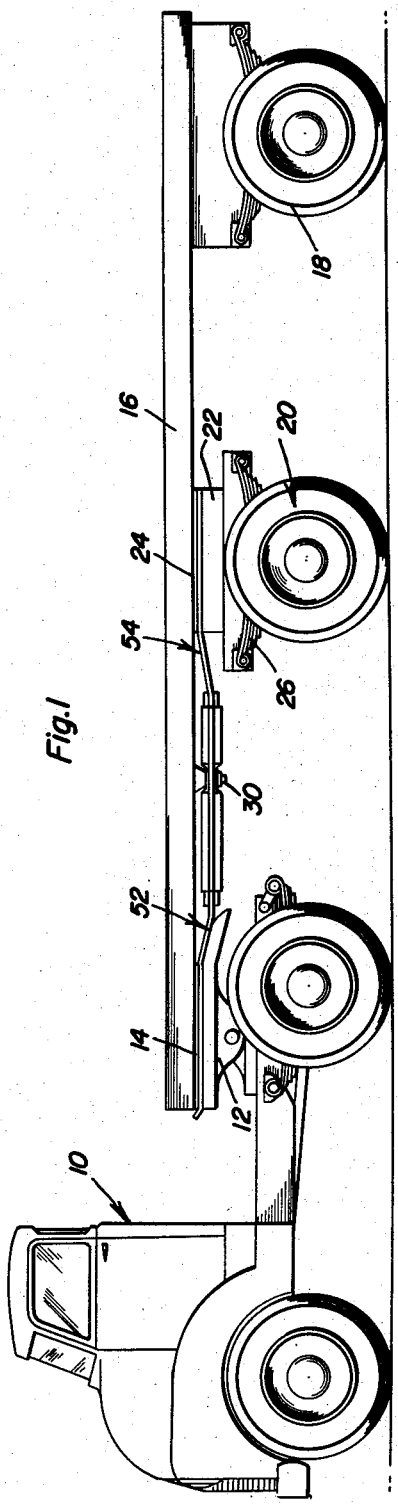
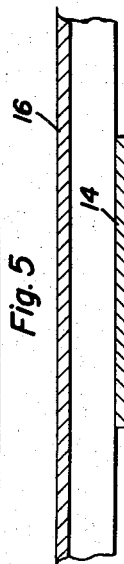
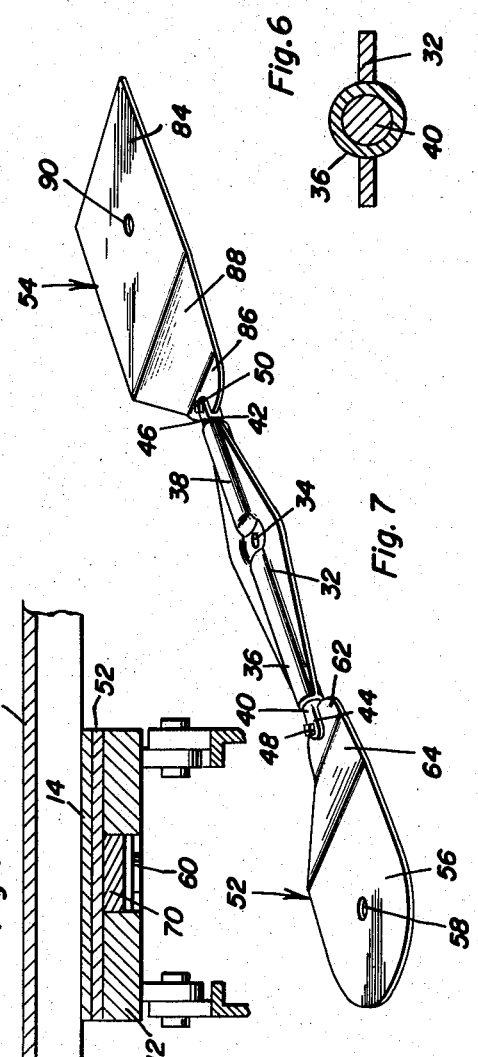
Henry A. Haas
INVENTOR.

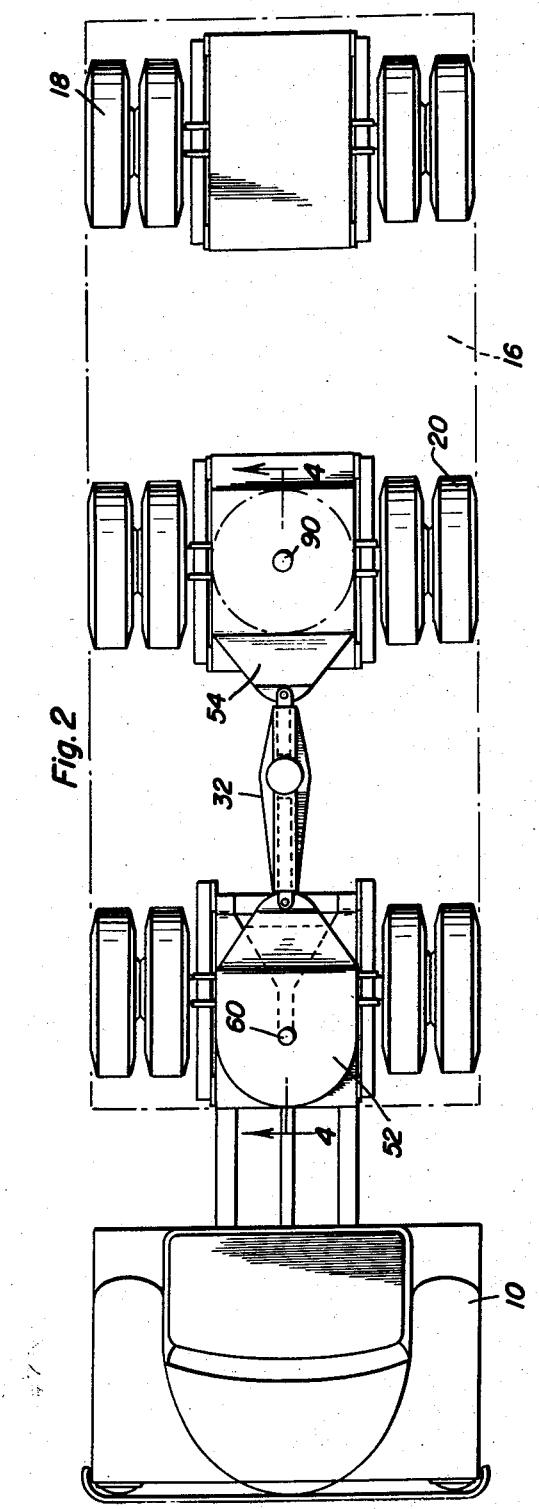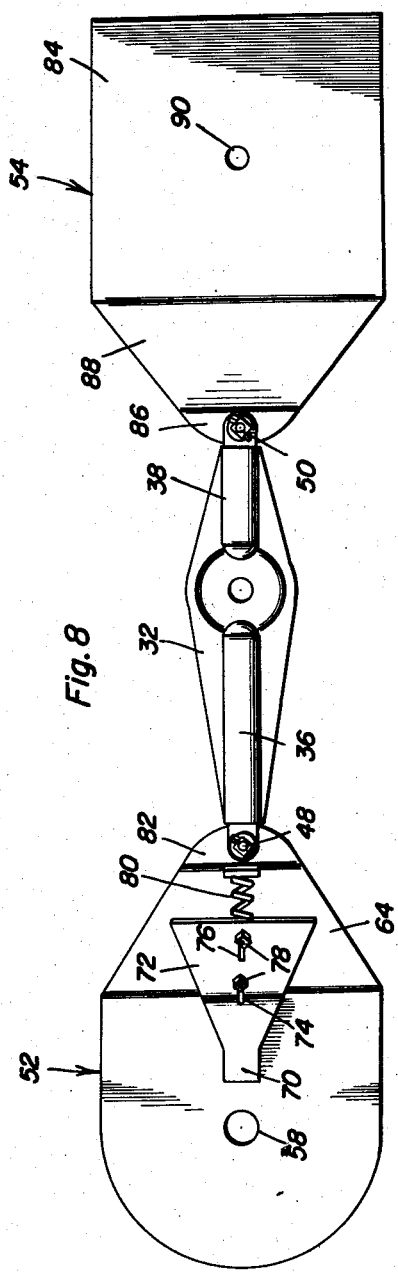
Henry A. Haas
INVENTOR.

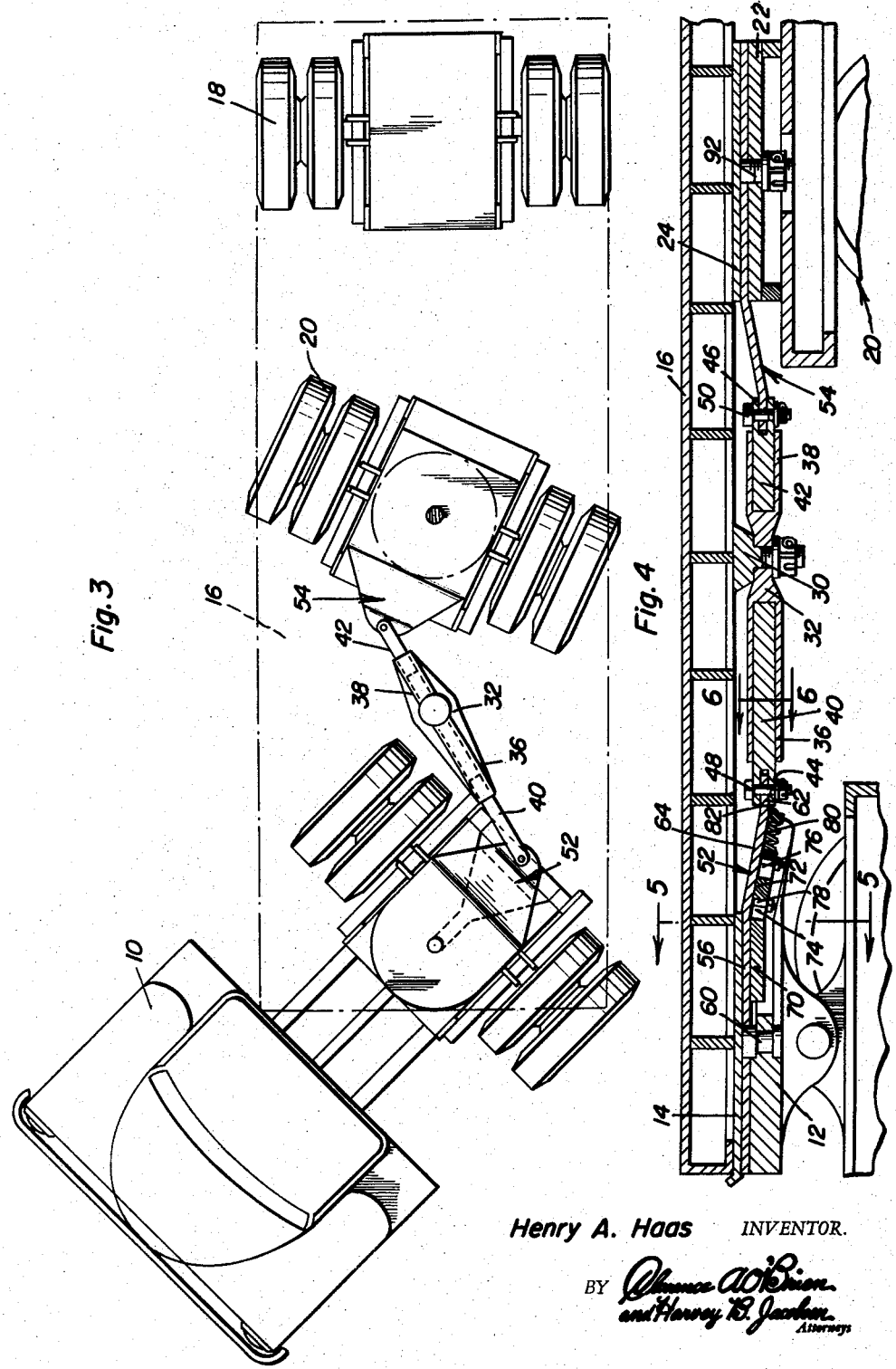
Henry A. Haas INVENTOR.

United States Patent Office 2,925,285
Patented Feb. 16, 1960

2,925,285

FIFTH WHEEL STEERING ASSEMBLY FOR TRAILERS

Henry A. Haas, Springfield, Mo.

Application March 3, 1958, Serial No. 718,897

11 Claims. (Cl. 280—426)

This invention comprises a novel and useful fifth wheel steering assembly for trailers and more particularly relates to an auxiliary fifth wheel assembly mounted intermediate the ends of the trailer and carrying a set of supporting wheels together with a steering mechanism for the auxiliary set of wheels.

In the larger type of trailers, numerous state highway regulations impose limits upon the loads which may be carried by the trailer. The installation of a set of auxiliary supporting wheels for the trailer intermediate the ends of the latter would enable the carrying of several thousand more pounds of freight under such weight regulations, thereby greatly contributing to the economy of operating the trailer. However, since such auxiliary wheels must be positioned considerably forward of the usual rear axle or rear tandem axles of the trailer, and considerably rearward of the fifth wheel which supports the front end of the trailer, it is necessary that some steering means be provided for these auxiliary wheels in order to avoid a sidewise drag of the same upon the road when the tractor and trailer are making a turn.

It is therefore the primary object of this invention to provide means whereby a set of auxiliary support wheels together with an auxiliary fifth wheel assembly may be mounted upon a trailer together with an interconnection between the auxiliary fifth wheel and the tractor fifth wheel unit in order to effect automatic steering of the auxiliary wheel assembly.

A further and specific object of the invention is to provide a steering mechanism adapted for use in the organization set forth in the preceding object and which shall effectively compensate for the varying distances in the linkages which are imposed by the pivoting or horizontal swinging movement of the fifth wheel assembly and the auxiliary fifth wheel assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a tractor-trailer combination in which the auxiliary fifth wheel, support wheels and steering mechanism of this invention have been applied;

Figure 2 is a view in horizontal plan of the arrangement of Figure 1, the bed of the trailer being removed in order to more clearly show the arrangement of the steering mechanism;

Figure 3 is a view similar to Figure 2 but showing in contrast therewith the position of the fifth wheel and the auxiliary fifth wheel when the tractor vehicle is making a turn and illustrating a manner in which the auxiliary support wheels are turned for steering purposes in coordination with the turning of the tractor vehicle;

Figure 4 is a vertical longitudinal central sectional view taken substantially upon the plane indicated by the section line 4—4 of Figure 2 and showing further details of the arrangement of the steering linkage connecting the tractor fifth wheel and the auxiliary fifth wheel in accordance with this invention;

Figure 5 is a vertical transverse sectional view taken substantially upon the plane indicated by the section line 5—5 of Figure 4 and showing the manner in which the steering mechanism of this invention is connected to the tractor fifth wheel unit;

Figure 6 is a vertical transverse sectional view taken substantially upon the plane indicated by the section line 6—6 of Figure 4 and showing the manner in which compensation is made in the steering linkage for variations in the length of the latter during operation of the device;

Figure 7 is a perspective view of the steering lever forming a part of the linkage system of this invention; and Figure 8 is a bottom plan view of the steering linkage assembly of this invention.

Referring first to Figure 1 it will be seen that any conventional form of tractor unit designated generally by the numeral 10, is provided with a fifth wheel unit 12 of conventional design to which is coupled the upper fifth wheel assembly plate 14 mounted upon a trailer unit 16. The trailer unit is provided with the usual rear axle assembly 18 which may be either of the single axle or tandem axle type as desired.

In accordance with this invention, in order to increase the permissible load carried by a trailer in accordance with various state highway regulations, there is provided an auxiliary supporting wheel assembly designated generally by the numeral 20 and which is operatively connected to the trailer upon its underside intermediate the ends of the trailer in order to assist in supporting more equally the load of the trailer upon the road bed. The auxiliary wheel assembly 20 is connected to the trailer by an auxiliary fifth wheel assembly, the same including a lower fifth wheel plate 22 carried by and mounted upon the auxiliary wheel assembly 20, and an upper fifth wheel plate 24 which is suitably secured to the underside of the trailer frame. Suitable spring means 26 are interposed between the auxiliary wheel assembly 20 and the auxiliary fifth wheel assembly member 22 in order that the load of the trailer may be uniformly distributed between the tractor vehicle 10, the rear axle assembly 18 and the auxiliary wheel assembly 20.

A steering linkage is connected to the fifth wheel assemblies of the tractor and of the auxiliary wheel assembly 20 to interconnect the same and thus properly coordinate the movement of the auxiliary wheel assembly in conjunction with turning of the tractor vehicle to effect proper steering of the trailer. For this purpose, as shown best in Figure 4, the underside of the trailer bed is provided with a depending fulcrum or pivot pin 30 upon which is journaled at its midportion a steering lever 32. As shown in Figure 7, this latter may include a flat blade-like element having a relatively widened midportion which is apertured at 34 to receive the above mentioned pivot 30, and which has extending from its midportion to its opposite ends a pair of generally aligned tubular or cylindrical elements 36 and 38. The element 36 extends forwardly, while the element 38 extends rearwardly, these elements being respectively operatively connected to the fifth wheel unit of the tractor and the auxiliary fifth wheel unit of the auxiliary support wheels in a manner to be now described. The tubular elements 36 and 38 may be of unequal length and in any desired proportional length in order to obtain a desired mechanical advantage or leverage as set forth hereinafter.

Slidably received in the tubular members 36 and 38 are a pair of rods 40 and 42 respectively. The detail view of Figure 6 shows in cross-section the relative association of the rod 40, the tubular member 36 and the steering lever 30. It will be understood that the other end of the steering lever and its association with the rod 42 is of similar construction.

At their outer ends, the rods 40 and 42 are each bifurcated as at 44 and 46 respectively and by means of bolts or pivot pins 48 and 50 are rigidly connected to a pair of adapter or connector plates 52 and 54 respectively.

The forward plate 52 comprises a flat portion 56 which corresponds to the shape and size of the lower fifth wheel plate 12 of the tractor unit and is provided with a central aperture 58 which receives the king pin 60 by which the upper and lower plates 14 and 12 of the tractor fifth wheel unit are pivotally connected together. At its rearward end the forward plate 52 is provided with a flat portion 62 which is apertured to receive the previously mentioned pivot 48 by which the rod 40 is pivotally connected to the forward plate. Since the plate portions 56 and 62 are displaced vertically from each other as will be apparent from Figure 4, there is an inclined plate-like portion 64 connecting these elements as will be readily apparent from a comparison of Figures 4 and 7.

In order that movement of the trailer unit may impart swinging movement to the steering lever 32, it is necessary to key or lock the forward portion 56 of the plate 52 to the lower fifth wheel unit 12. For this purpose, use is made of the usual rearwardly opening slot in the lower fifth wheel plate to effect a detachable keying or locking action.

Underlying the forward and inclined portions 56 and 64 of the forward plate 52 is an angulated block or key consisting of a forwardly extending downwardly projecting stem 70 whose upper surface is parallel to the underside of the forward portion 56, and a rearwardly and downwardly inclined rearwardly divergent wedge shaped block 72 which slidingly engages the underside of the plate portion 64 and is of appropriate shape to be snugly received in the previously mentioned rearwardly opening slot in the lower fifth wheel plate 12 in accordance with the conventional and customary construction of fifth wheel constructions. A pair of longitudinally elongated slots 74 and 76 are provided in the block portion 72 and fastening bolts 78 carried by the underside of the forward plate portion 64 extend through the slots 74 and 76, are slidable therein and provide a means for securing the key to the underside of the forward plate member 52.

A compression spring 80 abuts against the rearward end of the block portion 72 and a depending flange 82, as shown in Figures 4 and 8, to yieldingly urge the keying block forwardly whereby the bolt 78 will engage the rearward ends of their slots 74 and 76, and the upper surface of the stems 70 will abut the underside of the forward plate portion 56, while the widened rear portion 72 will abut the underside of the inclined portion 64.

The rearward plate 54 likewise has a pair of flat rearward and forward vertically displaced substantially parallel portions 84 and 86 which are connected by an inclined portion 88, the portion 86 receiving the fastener 50 by which the rearward plate 54 is pivoted to the lever 30, while the portion 84 is provided with an aperture 90 for receiving therethrough the king pin 92 by which the upper and lower plates 24 and 22 of the auxiliary fifth wheel assembly are pivotally connected. It will be understood that the rearward plate 84 is to be fixedly secured to the lower plate 22 of the auxiliary fifth wheel assembly in any suitable manner to prevent relative rotation therebetween.

The operation of the device is as follows:

When the tractor unit is turned as shown in Figure 3, the forward plate 52, being keyed thereto by engagement of the depending block portions 70 and 72 in the slot in the lower fifth wheel plate 12, will likewise be turned therewith about the axis of the pivot pin 60. This will impart a horizontal swinging movement to the plate portion 62, and by the pivotal connection 48 will impart a reverse horizontal swinging movement to the lever 30 about its pivot pin 30. This in turn will effect a reverse horizontal swinging movement to the rearward plate 54 and to the auxiliary fifth wheel assembly and the auxiliary supporting wheels which are rigidly connected therewith. Thus, the auxiliary wheels will move in the same direction as the rear wheels of the tractor unit to assist in steering the trailer and prevent sliding of the auxiliary supporting wheels upon the road bed. It will be observed by a comparison of Figures 2 and 3 that this turning movement will require a different amplitude of swinging movement of the tractor unit rear wheels and fifth wheel unit as compared to the degree of movement necessary for the intermediately disposed auxiliary supporting wheels and the auxiliary fifth wheel unit. Consequently, the distance between the pivot pins 48 and 50 of the connection between the two fifth wheel units will vary, and such variation is permitted by the sliding engagement of the rods 40 and 42 in the tubular portions 36 and 38 of the steering lever 32.

The spring 80 and the slots will permit a limited sliding movement of the locking key with respect to the forward plate 52, as will be required during this turning movement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said assemblies each icluding upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever.

2. A steering assembly for interconnecting a pair of fifth wheel assemblies whereby turning of a first assembly will correspondingly effect turning of a second assembly comprising; a steering lever mounted intermediate its ends for horizontal swinging movement about a fixed vertical axis disposed intermediate said assemblies, a pair of arms extensibly slidably mounted upon the opposite ends of said lever, plates pivoted to the remote ends of said arms for horizontal swinging about vertical axes, means securing said plates to said assemblies between the upper and lower plates thereof and fixedly to the latter.

3. The combination of claim 2 wherein said lower plate includes a pair of tubes, said arms comprising rods slidable in said tubes.

4. The combination of claim 2 wherein each plate comprises parallel inner and outer flat portions, said outer portions being disposed between said upper and lower plates of said assemblies and receiving the king pins of the latter through said apertures, said inner portions being connected to said lever.

5. The combination of claim 2 wherein each plate comprises parallel inner and outer flat portions, said outer portions being disposed between said upper and lower plates of said assemblies and receiving the king pins of the latter through said apertures, said inner portions being connected to said lever, said securing means including a block slidably mounted upon the outer portions of one of said plates and upon the bottom thereof and having locking engagement with the lower plate of the tractor fifth wheel assembly.

6. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever.

7. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever, one of said plates having means for locking it to the lower plate of a tractor fifth wheel assembly.

8. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever, each of said plates being connected to a fifth wheel assembly between the upper and lower plates thereof.

9. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever, each of said plates being connected to a fifth wheel assembly between the upper and lower plates thereof, said plates connected to said lever being apertured to receive a fifth plate kingpin therethrough.

10. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever, each of said plates being connected to a fifth wheel assembly between the upper and lower plates thereof, one of said plates having means for locking it to the lower plate of the tractor fifth wheel assembly, said locking means comprising a block slidably mounted upon said one plate and engaged in a slot in the tractor fifth wheel assembly lower plate.

11. In a tractor-trailer combination wherein the tractor unit has a fifth wheel assembly to which the forward end of the trailer unit is connected, an auxiliary support wheel assembly, a trailer fifth wheel assembly connecting the support wheel assembly to said trailer unit rearwardly of the tractor unit fifth wheel assembly, said fifth wheel assemblies each including upper and lower plates, a steering linkage operatively connecting the lower plates of the fifth wheel assemblies for simultaneous operation, said steering linkage including a steering lever pivoted intermediate its ends to said trailer unit for horizontal swinging movement, connecting means securing opposite ends of said lever to said fifth wheel assemblies, said connecting means including longitudinally extensible arms of said lever, each of said plates being connected to a fifth wheel assembly between the upper and lower plates thereof, one of said plates having means for locking it to the lower plate of the tractor fifth wheel assembly, said locking means comprising a block slidably mounted upon said one plate and engaged in a slot in the tractor fifth wheel assembly lower plate, and spring means engaging said block and said one plate and yieldingly urging the former forwardly upon the latter.

References Cited in the file of this patent

UNITED STATES PATENTS

| Number | Name | Date |
| --- | --- | --- |
| 2,286,166 | Carmody | June 9, 1942 |
| 2,764,424 | Standing | Sept. 25, 1956 |
| 2,793,052 | Googe | May 21, 1957 |
| 2,819,911 | Ranta | Jan. 14, 1958 |

FOREIGN PATENTS

| Number | Country | Date |
| --- | --- | --- |
| 74,521 | Denmark | Aug. 4, 1952 |